(12) United States Patent
Au et al.

(10) Patent No.: US 8,457,304 B2
(45) Date of Patent: Jun. 4, 2013

(54) EFFICIENT ENCODING PROCESSES AND APPARATUS

(75) Inventors: Oscar Chi Lim Au, Hong Kong (CN); Jiantao Zhou, Hong Kong (CN)

(73) Assignee: Choy Sai Foundation L.L.C., Wilmington, DE (US)

( * ) Notice: Subject to any disclaimer, the term of this patent is extended or adjusted under 35 U.S.C. 154(b) by 1077 days.

(21) Appl. No.: 12/035,614

(22) Filed: Feb. 22, 2008

(65) Prior Publication Data

US 2008/0273693 A1 Nov. 6, 2008

Related U.S. Application Data

(60) Provisional application No. 60/902,869, filed on Feb. 23, 2007.

(51) Int. Cl.
*H04K 1/00* (2006.01)
*H04L 9/00* (2006.01)
*H04L 12/28* (2006.01)
*H03M 7/00* (2006.01)
*H03M 7/40* (2006.01)

(52) U.S. Cl.
USPC ............... 380/28; 380/46; 341/50; 341/65; 370/392

(58) Field of Classification Search
USPC ........................................ 380/28–30
See application file for complete search history.

(56) References Cited

U.S. PATENT DOCUMENTS

2006/0290537 A1* 12/2006 Bay .................................. 341/50
2007/0230694 A1* 10/2007 Rose et al. ....................... 380/46

OTHER PUBLICATIONS

Chung-Ping Wu, Design of Integrated Multimedia Compression and Encryption Systems; Oct. 2005; IEEE; p. 828-839.*
J. Orlin Grabbe: Cryptography and Number Theory for Digital Cash, 1997; Google, p. 1-26 (Note: please see the document's date on the bottom of p. 25 "Posted here Oct. 10, 1997").*

* cited by examiner

*Primary Examiner* — Evans Desrosiers
(74) *Attorney, Agent, or Firm* — Turocy & Watson, LLP

(57) ABSTRACT

A method for encoding video includes receiving data, and encrypting the data using at least four Huffman trees. A method for encoding video includes receiving data, and encrypting the data such that an internal state of a stream cipher is independent of plaintext and ciphertext. A video encoding system for encoding video in a computing environment includes means for accessing data, and means for encrypting the data such that there are approximately $2^{106}$ possibilities.

25 Claims, 12 Drawing Sheets

EFFICIENT ENCODING PROCESSES AND APPARATUS

CROSS REFERENCE TO RELATED APPLICATIONS

This application claims the benefit of U.S. Provisional Application No. 60/902,869, filed on Feb. 23, 2007, entitled "ROBUST LIGHTWEIGHT MULTIMEDIA ENCRYPTION METHODS BASED ON ENTROPY CODING", the entirety of which is incorporated herein by reference.

TECHNICAL FIELD

The subject disclosure relates to rate control optimizations for video encoding processes that efficiently process video data according to a processing model.

BACKGROUND

In cryptography, plaintext is the information that a sender wishes to transmit to receiver(s). Before the computer era, plaintext simply meant text in the language of the communicating parties. Since the advent of computers, the definition has been expanded to include not only the electronic representation of text, such as email and word processor documents, but also the computer representation of speech, music, pictures, videos, ATM and credit card transactions, sensor data, and so forth. Basically, any information that the communicating parties might wish to conceal from others could be classified as plaintext. The plaintext is the normal representation of the data before any action has been taken to conceal it.

The plaintext is used as input to an encryption algorithm; the output is termed ciphertext. In some systems, however, multiple layers of encryption are used, in which case the ciphertext output of one encryption algorithm becomes the plaintext input to the next.

By way of further background, in cryptography, a stream cipher is a symmetric cipher where plaintext bits are combined with a pseudorandom cipher bit stream (keystream), typically by an exclusive-or (xor) operation. In a stream cipher, the plaintext digits are encrypted one at a time, and the transformation of successive digits varies during the encryption. An alternative name is a state cipher, as the encryption of each digit is dependent on the current state. In practice, the digits are typically single bits or bytes.

Stream ciphers represent a different approach to symmetric encryption when compared to block ciphers. Block ciphers operate on large blocks of digits with a fixed, unvarying transformation. This distinction is not always clear-cut: in some modes of operation, a block cipher primitive is used in such a way that it acts effectively as a stream cipher. Stream ciphers typically execute at a higher speed than block ciphers and have lower hardware complexity. However, stream ciphers can be susceptible to security issues.

Advances in digital multimedia and communication technologies have paved the way for people around the world to acquire, utilize, and share multimedia information. In such distributed environment, the problems associated with multimedia security are becoming increasingly important. A common way to protect multimedia content is to encrypt the entire sequence using conventional cryptographic algorithms such as the Data Encryption Standard (DES), which is a cipher (a method for encrypting information) selected as an official Federal Information Processing Standard (FIPS) for the United States in 1976, and which has subsequently enjoyed widespread use internationally.

In recent years, the DES cipher has been superseded by the Advanced Encryption Standard (AES). Due to the high data rate of multimedia signal, AES requires a considerable amount of computational power, and usually is not fast enough to meet real-time delivery requirements. In order to reduce the overhead, selective encryption has been suggested. However, the security of most of the selective encryption systems is not high, and often the coding efficiency is sacrificed. Consequently, designing a robust multimedia encryption scheme, which features high level of security and low computational cost, is a challenging task.

A multiple Huffman table (MHT) method has also been proposed that combines encryption with entropy coding using multiple statistical models alternatively in a secret order. The major advantage of the proposed MHT method is the provision of relatively secure encryption while simultaneously achieving unaffected compressio, requiring almost negligible additional overhead. Nevertheless, the basic MHT method is only secure under cipher-only and known-plaintext attacks, but is vulnerable under chosen-plaintext attacks (CPAs).

In this regard, a CPA is an attack model for cryptanalysis that presumes that the attacker has the capability to choose arbitrary plaintexts to be encrypted and obtain the corresponding ciphertexts. To improve security, enhanced MHT schemes have been proposed by either inserting random bits in the generated bit stream or integrating with a stream cipher. Another proposal has suggested random rotation in partitioned bit streams, as applied to an MHT system. However, there is still room for improvement in cryptographic algorithms.

The above-described deficiencies of current designs for cryptography are merely intended to provide an overview of some of the problems of today's designs, and are not intended to be exhaustive. Other problems with the state of the art and corresponding benefits of the innovation may become further apparent upon review of the following description of various non-limiting embodiments of the innovation.

SUMMARY

Video data encoding optimizations are provided for video encoding and compression processes that efficiently encode data. The optimizations take into account Huffman coding, including, but not limited to, MPEG (Moving Picture Experts Group) and JPEG (Joint Photographic Experts Group). The input symbols are converted into bit streams by look-up table operations according to some predefined Huffman tables.

A method for encoding video, includes receiving data, and encrypting the data using at least four Huffman trees. A method for encoding video, includes receiving data, and encrypting the data such that an internal state of a stream cipher is independent of plaintext and ciphertext. A video encoding system for encoding video in a computing environment, includes means for accessing data, and means for encrypting the data such that there are approximately $2^{106}$ possibilities.

A simplified summary is provided herein to help enable a basic or general understanding of various aspects of exemplary, non-limiting embodiments that follow in the more detailed description and the accompanying drawings. This summary is not intended, however, as an extensive or exhaustive overview. The sole purpose of this summary is to present some concepts related to the various exemplary non-limiting embodiments of the innovation in a simplified form as a prelude to the more detailed description that follows.

BRIEF DESCRIPTION OF THE DRAWINGS

The optimizations for video encoding processes are further described with reference to the accompanying drawings in which.

DETAILED DESCRIPTION

Overview

As discussed in the background, there is still room for improvement in cryptographic algorithms. Since the number of Huffman tables that can be used is typically very limited in conventional systems, they cannot offer high level of security. Or, in order to increase the model space while maintaining the computational efficiency, the MHT algorithms keep the structure of the Huffman tree, but enlarge the model space through tree mutation.

Figure 1:
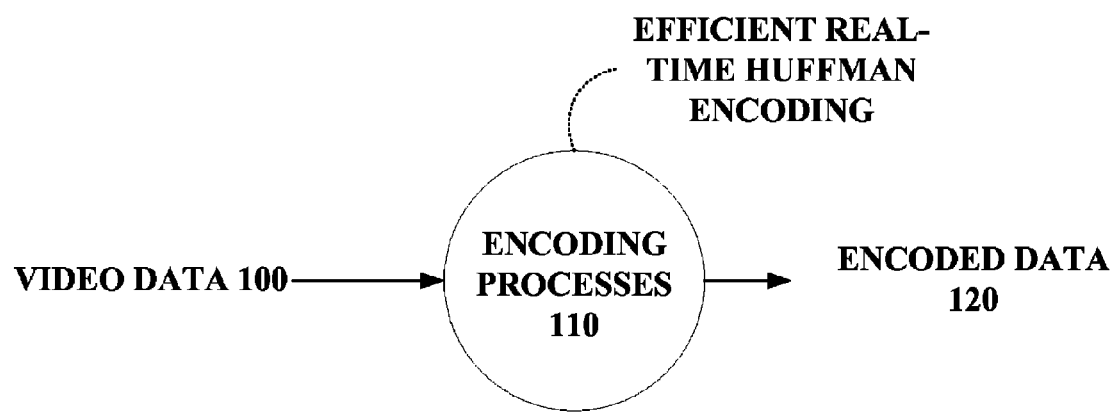
FIG. 1 illustrates exemplary, non-limiting encoding processes.
Figure 2:
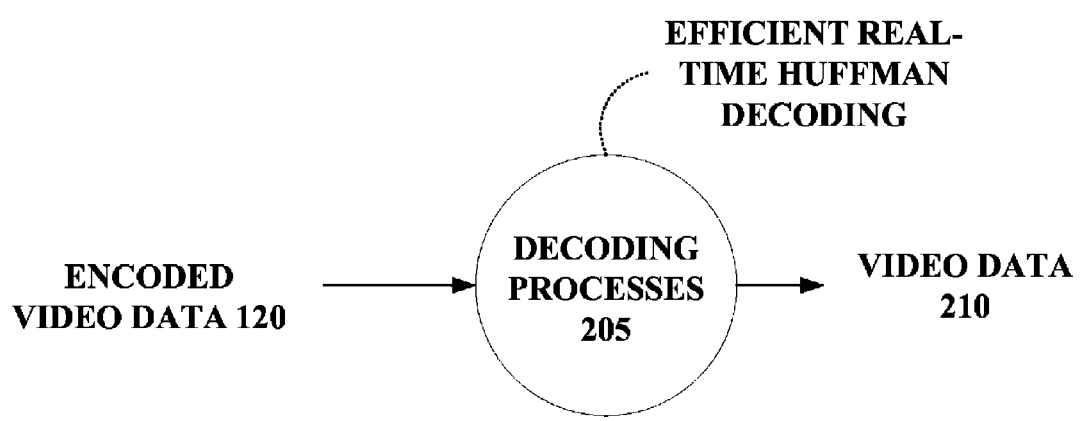
FIG. 2 illustrates exemplary, non-limiting decoding processes performed in accordance with the rate control optimizations for video encoding processes in accordance with the innovation.

FIG. 1 illustrates an efficient real-time Huffman encoding where video data 100 undergoes encoding processes 110 and encoded data is output. More particularly, plaintext can be used as input to an encryption algorithm; and the encryption algorithm outputs ciphertext. As shown in FIG. 1 at a high level, the video encoding includes receiving video data 100, encoding the video data 100 according to a set of encoding rules implemented by a set of encoding processes 110 that enable a corresponding decoder to decode the encoded data 120 that results from encoding processes 110. Encoding processes 110 typically compress video data 100 such that representation 120 is more compact than representation 100. Encodings can introduce loss of resolution of the data while others are lossless allowing video data 100 to be restored to an identical copy of video data 100. In addition, the encoding processes 110 can encrypt the data (compressed and uncompressed). The encrypted data 120 can be decoded as illustrated in FIG. 2. For example, the data can be video data (as well as any other type of data desired to be protected), and at least one decoding process 205 is employed to obtain video data.

Figure 3:
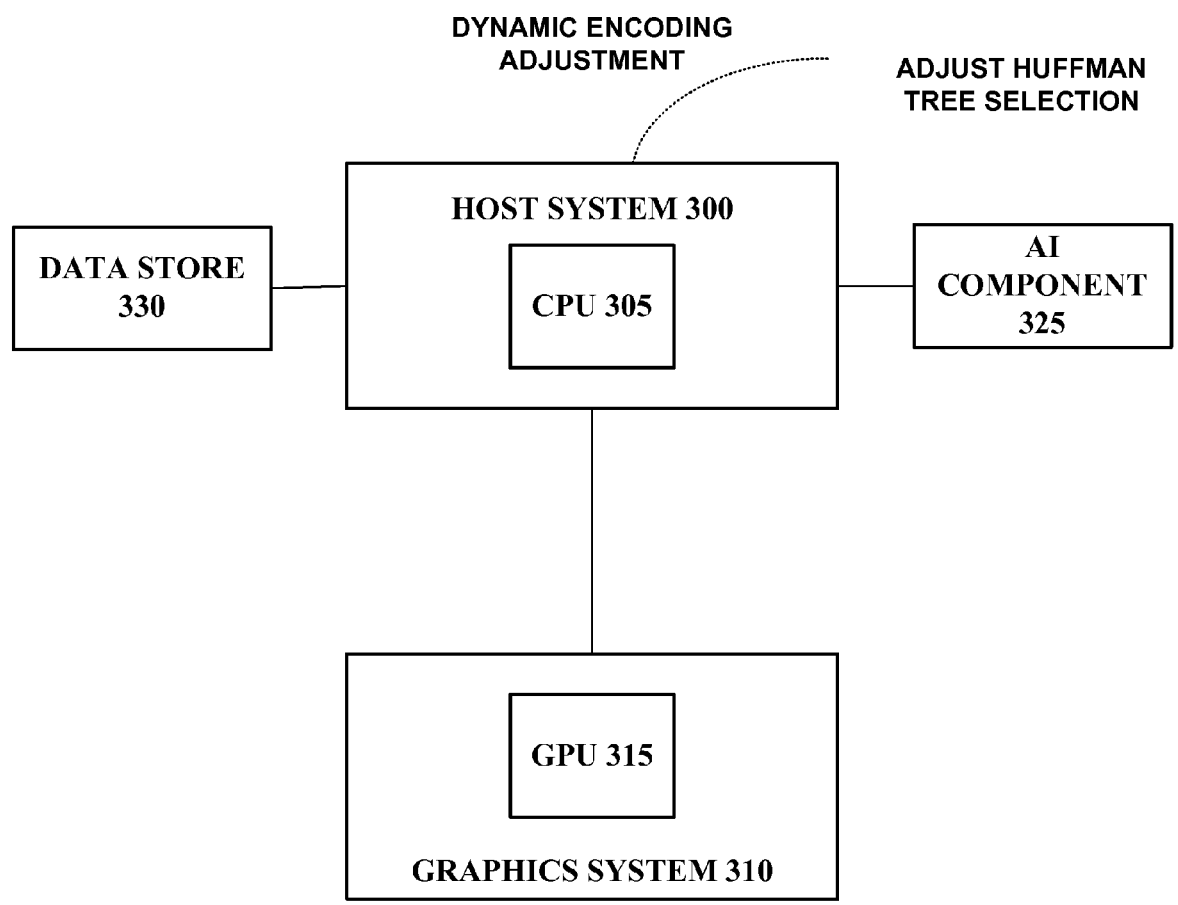
FIG. 3 is a flow diagram illustrating exemplary flow of data between a host and graphics subsystem in accordance with the rate control optimizations for video encoding processes in accordance with the innovation.

FIG. 3 is a block diagram illustrating an exemplary, non-limiting co-processing model for sharing processing for performing the optimized encoding in accordance with the invention. In a co-processing model, encoding processing is shared between a host processor, such as CPU 305 of host system 300, and a co-processor, such as GPU 315 of graphics system 310. As a result of the optimizations of the herein described encryption processes, the encoding time reduces significantly by efficiently utilizing the processing power of GPU 315. In addition, arithmetic intensity, i.e., the number of operations by GPU 315 per word of data transferred from texture memory, optimizes for different graphics system 210 easily. In one embodiment, the employ of an artificial intelligence (AI) component 325 is done. The AI component 325 can be employed to facilitate inferring and/or determining when, where, how to dynamically vary the encryption. For example, the specific set of Huffman trees can be dynamically varied. Such inference results in the construction of new events or actions from a set of observed events and/or stored event data, whether or not the events are correlated in close temporal proximity, and whether the events and data come from one or several event and data sources.

The AI component can also employ any of a variety of suitable AI-based schemes in connection with facilitating various aspects of the herein described innovation. For example, and in the context of a Structured Query Language (SQL) server/client where the client is a customer of the bank and the bank is using a server, a process for learning explicitly or implicitly how a value related to a parsed SQL statement should be replaced can be facilitated via an automatic classification system and process. Classification can employ a probabilistic and/or statistical-based analysis (e.g., factoring into the analysis utilities and costs) to prognose or infer an action that a user desires to be automatically performed.

For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

In this work, the security of the basic MHT scheme and some enhanced methods is analyzed. It is demonstrated herein that the multiple Huffman tables adopted should be carefully selected, otherwise the computations needed by exhaustive search will be significantly reduced. Furthermore, suggested herein are two criteria for multiple Huffman tables selection, based on which tables (as used herein the terms "Huffman trees" and "Huffman tables" are interchangeable) and can further simplify the system while ensuring high level of security.

As a roadmap for what follows, an overview of MHT methods is first presented. Next, a security analysis is shown for both the basic and the enhanced MHT scheme inserting random bits. Two criteria for Huffman tables selection, together with a simplified MHT scheme are then discussed in accordance with various embodiments, followed by a concluding discussion.

Entropy coding bears some special properties, which are potentially linked with cryptography. Suppose B is the encoded binary bit stream of the message source X, and the mutual information between them is I(X; B)=H(B)−H(B|X). If the statistical model, i.e., the mapping from the symbol to the codeword, is unavailable, H(B;X)=H(B) since, given an alphabet string, all possible bit streams are equally probable. As a result, I(X; B)=0, meaning that the entropy coding system has perfect secrecy in Shannon-sense. This underlying connection provides a connection between encryption with compression.

Huffman coding is very popular in modern multimedia compression system, including MPEG and JPEG. The input symbols are converted into bit streams by look-up table operations according to some predefined Huffman tables. Since usually the number of Huffman tables that can be used is very limited, conventional systems cannot offer a very high level of security. In order to increase the model space while maintaining the computational efficiency, the MHT algorithms keep the structure of the Huffman tree but enlarge the model space through tree mutation. The procedure of the basic MHT algorithm is described as follows:

a) Train four original Huffman trees from different sets of training data.

b) Based on the original trees, perform tree mutation (i.e., re-labelling the branch) to create the whole Huffman tree space.

c) Randomly select m different tables from the space, and number them from 0 to m−1.

d) Generate a random vector $P=(p_0, p_1, \ldots p_{n-1})$ where each $p_i$ is an integer ranging from 0 to m−1, where m is an integer.

e) For the i-th encountered symbol, use table $p_{i(mod\,n)}$ to encode it.

Typically, one can set m=8 and n=1 2 8. Since both the creation of the Huffman tree space and the look-up table operations are not costly, the MHT scheme has only a small key-setup cost and encryption/decryption cost. On the other hand, since decoding a Huffman coded bit stream without knowing the probability mass function of the source can be complex, the basic MHT is secure under cipher-only attack and known-plaintext attack. However, under chosen-plaintext attack, it is vulnerable, even when the cipher can receive symbols as a whole chunk and output the corresponding codewords together.

As mentioned in the background, aiming to increase the security against chosen-plaintext attack, two types of enhanced schemes have been proposed: selective random bit insertion scheme, and stream cipher integrated scheme, have been proposed. In one case, another random vector $Q=(q_0, q_1 \ldots q_{n-1})$ is generated, where $q_i$ is a 1-bit integer. For the (w×i)-th bit in the encrypted bit stream, where w≧50 is a constant, function Fi will be performed.

$$F_i(A) = \begin{cases} \text{do nothing} & \text{for } q_{i(mod\,n)} = 0 \\ \text{add 1 random bit after } A, & \text{for } q_{i(mod\,n)} = 1 \end{cases} \quad \text{Eq. 1}$$

In the other case, a key stream $h(s_0)$ is generated using a stream cipher, where $s_0$ is the seed. Instead of XORing with the plaintext, the key stream will be partitioned into blocks $K_1 \| K_2 \| \ldots \| K_r \|$, where $K_i$ is a ($\log_2 m$)-bit integer determining a Huffman tree to encode the encountered symbols. Known-plaintext attack and weak keys problems thus exist.

Suppose one is given a bit stream $B=b_1, b_2, \ldots, b_n$, and knows that it is the multiple Huffman encoding of some symbol string $S=s_1, s_2, \ldots, s_n$. Since any bit stream is of equal probability, one has no knowledge to determine the boundary of B. Hence, in order to partition B into n nonempty sub-blocks $B_1, B_2, \ldots, B_n$, one can consider $$\binom{N-1}{n-1}$$

cases. In the traditional case where just one single Huffman table is used, one can check the prefix condition and consistence condition to eliminate some impossible partitions. In the current MHT scheme, one cannot do that so since these two conditions are not necessarily satisfied. However, if one can estimate the upper bound L to the length of a codeword, the number of partitions an be reduced from $$\binom{N-1}{n-1} = O(N^{n-1}) \text{ to } O(L^{n-1}).$$

Table 1 below sets forth some possible code lengths for symbols where in the length column are four numbers that correspond to the four original trees. From Table 1, it is known that L=11. Nonetheless, an attack with complexity of $O(11^n)$ is still formidable.

| Symbol | Length |
|---|---|
| '0' | 2 2 2 1 |
| '1' | 3 2 2 3 |
| '2' | 3 2 3 4 |
| '3' | 3 3 3 4 |
| '4' | 3 4 3 3 |
| '5' | 3 5 4 4 |
| '6' | 4 6 5 5 |
| '7' | 5 7 6 6 |
| '8' | 6 8 7 7 |
| '9' | 7 9 8 8 |
| '10' | 8 10 9 9 |
| '11' | 9 11 10 10 |

TABLE 1—Possible Code Lengths for Symbols

As described for various embodiments, the knowledge of the tree structure, i.e., the possible lengths of symbols, can be exploited. In the extreme case where all the m selected trees come from the same original tree, identical symbols in the symbol string have the same length. From Table 1, one can notice that any symbol takes at most 3 different lengths. This observation immediately reduces the number of cases to be checked to $3^{|\Omega|}=3^{13}$, since one only needs to guess the length once for all identical symbols. Here, Q denotes the symbol set {'0', '1', . . . , '11', 'error'}, and |•| is the set size. The complexity of order $3^{|\Omega|}$ is already feasible, especially when the given plaintext does not include all |Ω| different letters. In both the basic and the enhanced MHT, the Huffman tables are randomly selected from the tree space.

The probability that all m selected trees are mutated from the same original tree is $$Pr_1 = 4 \prod_{i=0}^{m-1} (M-i)/(4M-i) \approx 6 \times 10^{-5},$$

where $M=2^{12}$ is the total number of trees generated from one original tree. It is almost four times higher than that of the case where each of the four original trees contributes to m/4 selected trees $$Pr_2 = \prod_{i=0}^{m/4-1} (M-i)^4 \Big/ \prod_{j=0}^{m-1} (4M-j) \approx 1.52 \times 10^{-5}.$$

Note, also, that if all the m trees come from the last two original trees, around ⅔ of all symbols have fixed length. The occurring probability is $$Pr_3 = \prod_{i=0}^{m-1} (2M-i)/(4M-i) \approx 0.0039.$$

Hence, random selection of Huffman trees will introduce weak keys problem in the sense that some of the selected trees provide lower security than the others.

Before presenting the cryptanalysis against the enhanced scheme with random bit insertion, proposed herein is an efficient chosen-plaintext attack on the basic MHT method. Recall that under a chosen-plaintext attack, the basic MHT could be broken in $n|\Omega|$ times of encryption oracle access. But this result is only valid when each time the cipher receives one single symbol and outputs its corresponding codeword. In this application, the more complicated case is considered where a whole chunk of symbols are received and the corresponding codewords are output all together. The following proposition pertains:

Proposition I: Under a chosen-plaintext attack, the basic MHT can be broken in $n^2|\Omega|$ oracle accesses, when each time the cipher outputs the bit stream of n symbols all together.

Proof: The attack method is shown as follows.

Step 1: Input symbol string $s_1 s_2 \ldots s_{n-1}$ '0', and obtain bit stream $B_1 B_2 \ldots B_{n-1} B_n$, where $s_i \in \Omega$ can be any symbol, and $B_i$ is the corresponding codeword.

Step 2: Input another length-n string $s_1 s_2 \ldots s_{n-1}$ '11', and the bit stream is $B'_1 B'_2 \ldots B'_{n-1} B'_n$. Since the vector P determining which table is used is fixed, one has $B'_j = B_j$ for $j=1, \ldots, n-1$. '11' is chosen because '0' and '11' are separated by the root, i.e., the first bit of their codewords is different. Therefore, one can obtain $\hat{B} = B_1 B_2 \ldots B_{n-1} B_n 00 \ldots 0 \oplus B_1 B_2 \ldots B_{n-1} B'_n$, where $\oplus$ denotes XOR operation. Clearly, the left most 1 in $\hat{B}$ indicates the staring position of the codewords of '0' and '11'.

Step 3: Input length-n symbol stream $s_1 s_2 \ldots s_{n-1}$ '1'. Since the starting position has been determined in Step 2, it is straightforward to find the corresponding codeword of '1'. Continuing in this fashion, in Step $|\Omega|$, all the symbol-codeword pairs of the n th tree are recovered. Repeating such steps, one can restore all the symbol-codeword pairs for all n trees, and the computational cost is $n \times n |\Omega| = n^2 |\Omega|$.

Yet to be accomplished for the random bit insertion scheme is to find the inserted bits. Note that their locations are fixed as long as the vector Q has been determined. Let the encoded bit stream of symbol string $S = s_1 s_2 \ldots s_n$ be $\hat{B} = b_1 b_2 \ldots b_f y_1 b_{f+1} \ldots b_g y_2 b_{g+1} \ldots b_h y_3 b_{h+1} \ldots$, where $b_i$ is the original bit, and $y_i$ is the inserted random bit taking 0 or 1 with the same probability. One can encode S T times, and obtain $\hat{B}_1, \hat{B}_2, \ldots, \hat{B}_T$. One can then perform the XOR operations $R_i = \hat{B}_1 \oplus \hat{B}_i$, $i=2, \ldots, T$.

Due to the randomness of $y_i$, the bit 1 in $R_i$ reveals the locations of the inserted bits. The missing detection probability for every inserted bit is $2^{-T}$. After successful detection, one can simply remove them, and apply the attack described above to break the enhanced scheme. Since, when detecting the inserted bits, one exploits the randomness property, one may insert a deterministic bit instead of a random bit. In fact, this helps nothing to improve the security.

Recalling that the random bit will be added after the (w×i)th bit if $q_{i(mod\ \tilde{n})}=1$, in the bit stream, the (w+1)th bit is a suspicious bit to be the first inserted bit, and (2w+1)th and (2w+2)th bit are two suspicious bits to be the second added bit. In this way, one can find an all suspicious bits index. The number of random bits should not exceed 1% of the original ciphertext, thus, the total number of suspicious bits is quite limited. For example, if the bit stream after bit insertion is of length 700, and w=70, the total number of suspicious bits is $$\sum_{i=1}^{9} i = 45.$$

After recovering all the symbol-codeword pairs for each tree using the method shown in the proof, one can perform two additional checking steps a and b.

Step a: Check whether the obtained codewords contain suspicious bits according to the suspicious bits index. If yes, go to Step b, otherwise, continue to find the symbol-codeword pairs for the next table.

Step b: Check whether Eq. 2 holds, where $l_i$ denotes the length of the obtained codeword of symbol 'i'.

Since the Huffman tree is a complete tree, the Kraft inequality should be satisfied with equality if there is no inserted bit. Hence, if Eq. 2 holds, one knows that the symbol-codeword pairs obtained above are valid. However, in the case of E<1, meaning that there is a inserted bit in the codewords, one has $1-E=\Sigma_{l_i \geq u} 2^{-l_i}$, where $u \in N$ is the inserted bit location (relative position within the codeword, left to right order). Then, one can find the relationship of u and a quantity $Y=-\log_2(1-E)$ for four original trees, as shown in FIG. 11. It can be seen that if $u \geq 5$, one can obtain an unique solution of u from Y. When $2 \leq u < 5$, the number of solution is at most 2. The solution satisfying the prefix condition is the true location of the inserted bit, since inappropriate removing a bit in a fixed location for all codewords will merge two nodes in the Huffman tree together, thus, violate the prefix condition.

$$E = \sum_{i=0}^{|\Omega|-1} 2^{-l_i} = 1 \qquad \text{Eq. 2}$$

From the aforementioned analysis, one can see that if the order that the m tables are used is fixed, the MHT schemes are inherently insecure. To overcome this drawback, a simple yet effective method is to use a secure stream cipher to generate the using order sequence, and avoid using the same sequence more than once. It should be pointed out that the security of this kind of improved scheme still heavily relies on the tables selected. In addition, to achieve a certain level of security, the number of tables is also closely related to the table selection. Therefore, a natural question arising is how to appropriately choose small number of Huffman tables to ensure high levels of security.

It is observed that, in a MHT scheme, one symbol may be mapped to many different codewords, and in turn, one codeword may also correspond to many different symbols. This many-to-many mapping results in the existence of more than one symbol strings satisfying the same symbol distribution, which can be encoded to the same bit stream with certain using order sequence. These symbol strings are called alias symbol strings. In order to evaluate the bidirectional mapping, empirically defined are two quantities, namely, mapping diversity (MD) and codeword diversity (CD)

$$MD = \sum_{i=0}^{|\Omega|-1} C_i P_i \qquad \text{Eq. (3)}$$

where $C_i$ is the number of distinct codewords of symbol 'i', and $P_i$ is its occurring probability.

$$CD = \sum_{j=0}^{|\Omega|-1} L_j / 2^j \qquad \text{Eq. (4)}$$

where $L_j$ is the number of distinct codewords with length j.

It can be seen from Eq. 3 that, when the total number of Huffman tables that can be used is constrained, if MD is large, it is very likely that the symbols with high probabilities have been assigned many distinct codewords. Hence, there may exist two symbols 'i' and 'j' such that the two sets $C_{s_i}$ and $C_{s_j}$, formed by all the possible codewords of 'i' and 'j', respectively, share many common elements. For example, in FIGS. 5-8 are shown four trees, in which '0', '1' and '2' all correspond to the codeword subset {00, 01, 10, 11}. It is a very desirable property in the sense that it will significantly increase the number of alias symbol strings. Without loss of generality, suppose $P_i < P_j$, and for a length-n symbol string, the number of symbol 'i' and 'j' can be estimated as $nP_i$ and $nP_j$, respectively. If $C_{s_i}$ and $C_{s_j}$ are the same, for any swap operations between these two symbols, there must exist certain key streams, using which the final bit stream will not be altered. The number of different swaps is $$\frac{[(P_i + P_j)n]!}{(nP_i)! \times (nP_j)!} = \sum_{k=0}^{nP_i} \binom{nP_i}{k}\binom{nP_j}{k} =$$

$$1 + \sum_{k=1}^{nP_i} \binom{nP_i}{k}\binom{nP_j}{k} > nP_j \times 2^{nP_i} + (1 - nP_j) \qquad \text{Eq. (5)}$$

Although this lower bound is not very tight, one still can see that complexity grows exponentially with the input length n. Hence, under the above assumption, breaking the security belongs to the complexity class NP (nondeterministic polynomial time), but it cannot be proved that it is not in P (polynomial time). This situation is similar to that of other encryption schemes, e.g., the Diffie-Hellman key exchange protocol.

On the other hand, from Eq. 4 it can be seen that the larger the CD is, the more valid codewords with short codeword length there are, and hence, the complexity of exhaustive search by partitioning the bit stream is higher.

Consequently, when selecting the Huffman trees, one strategy is to assign more distinct codewords to those symbols with high probability. In this way, one can simplify the stream cipher integrated scheme while ensuring high level of security. In various embodiments, herein described is only using the four trees as shown in FIGS. 5-8. In addition, one can make all the four trees publicly accessible. In fact, hiding the Huffman trees cannot bring much extra security because it is easy to recover the symbol-codeword relationship by arbitrarily guessing a key stream. Now, the only private information is the seed for stream cipher, and thus, the only relevant attack model is the cipher-only attack, since the internal state of the stream cipher is independent of the plaintext and the ciphertext.

Figure 4A:
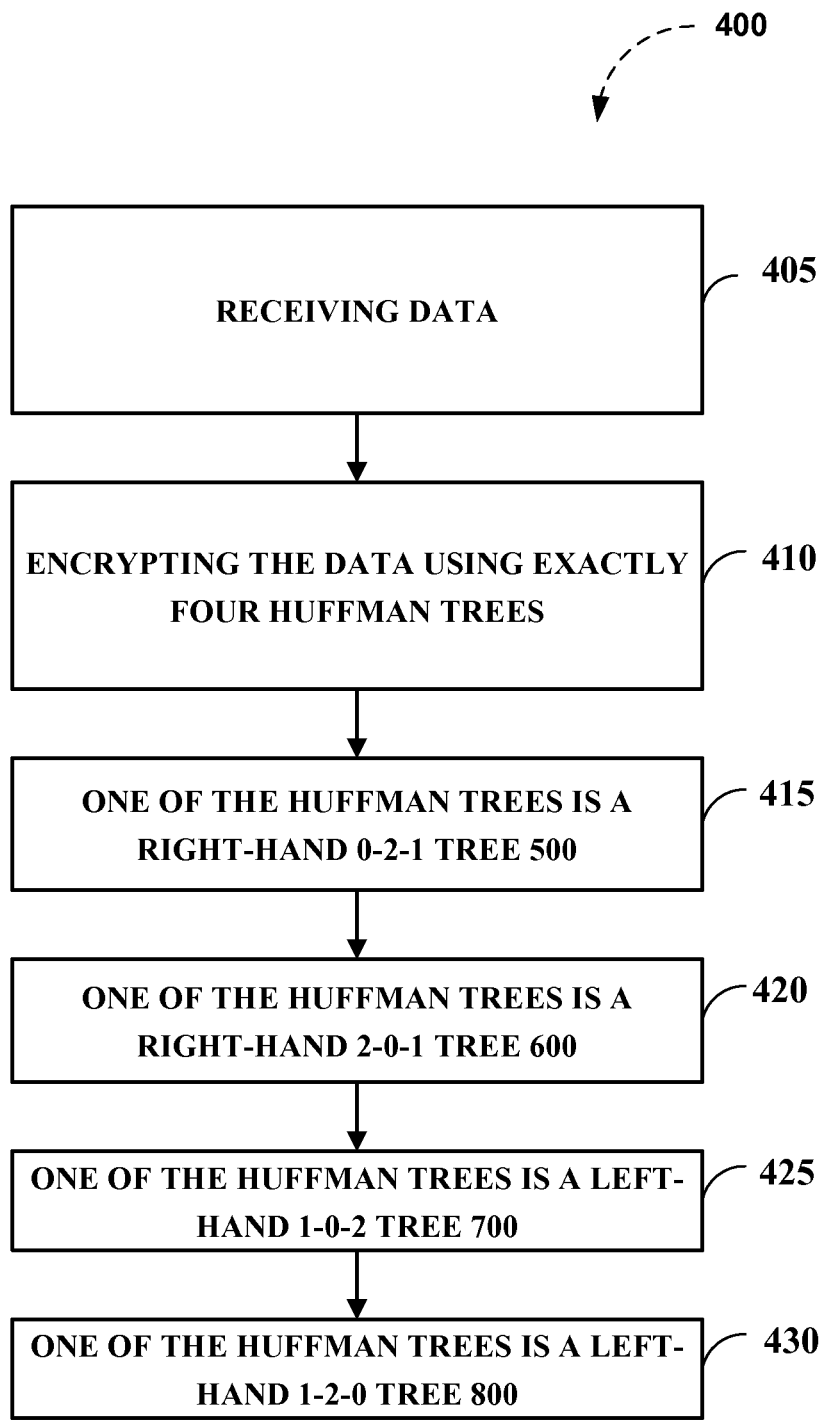
FIG. 4 is a flow diagram illustrating exemplary flow to encode a macro-block in accordance with the rate control optimizations for video encoding processes in accordance with the innovation.
Figure 5:
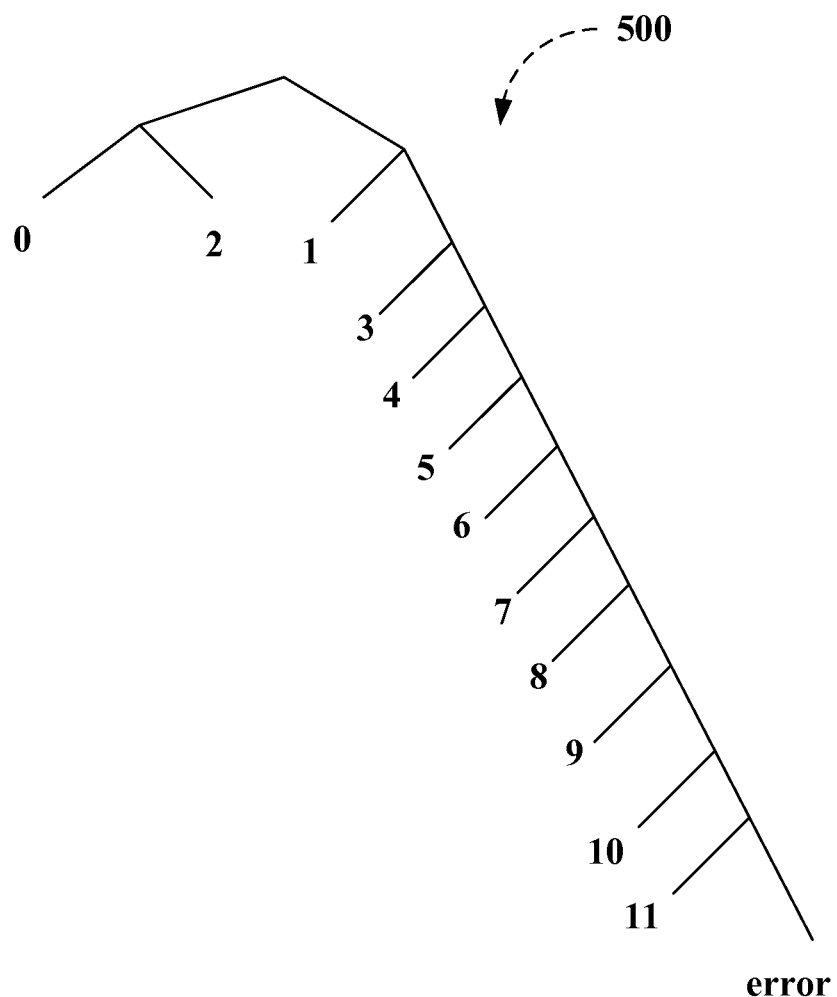
FIG. 5 is a flow diagram illustrating exemplary flow to estimate bits in accordance with optimizations for video encoding processes in accordance with the innovation.
Figure 6:
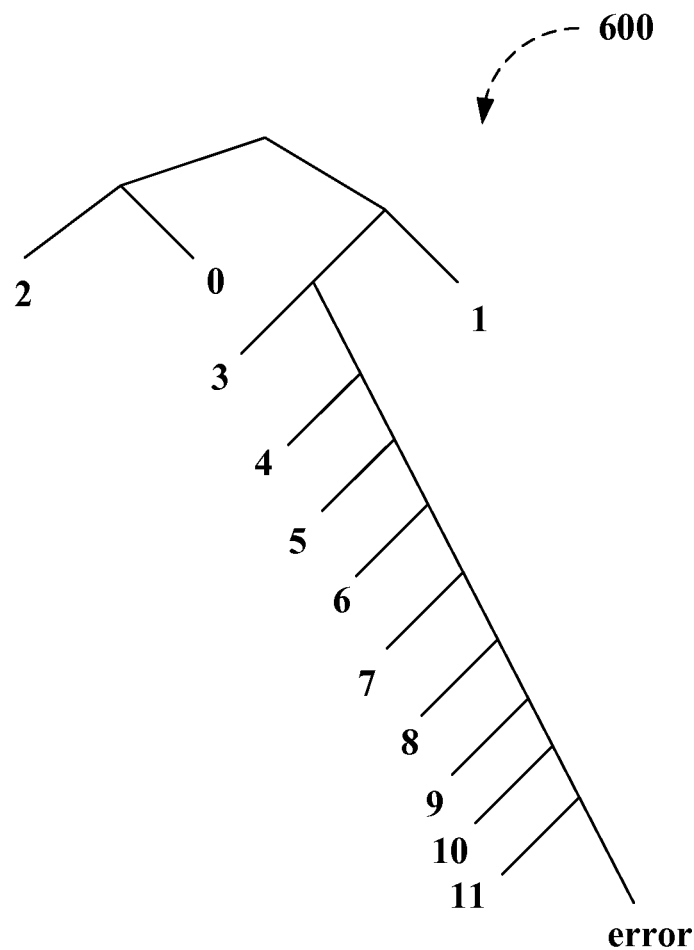
FIG. 6 is a flow diagram illustrating exemplary flow to encode macro-blocks in accordance with optimizations for video encoding processes in accordance with the innovation.
Figure 7:
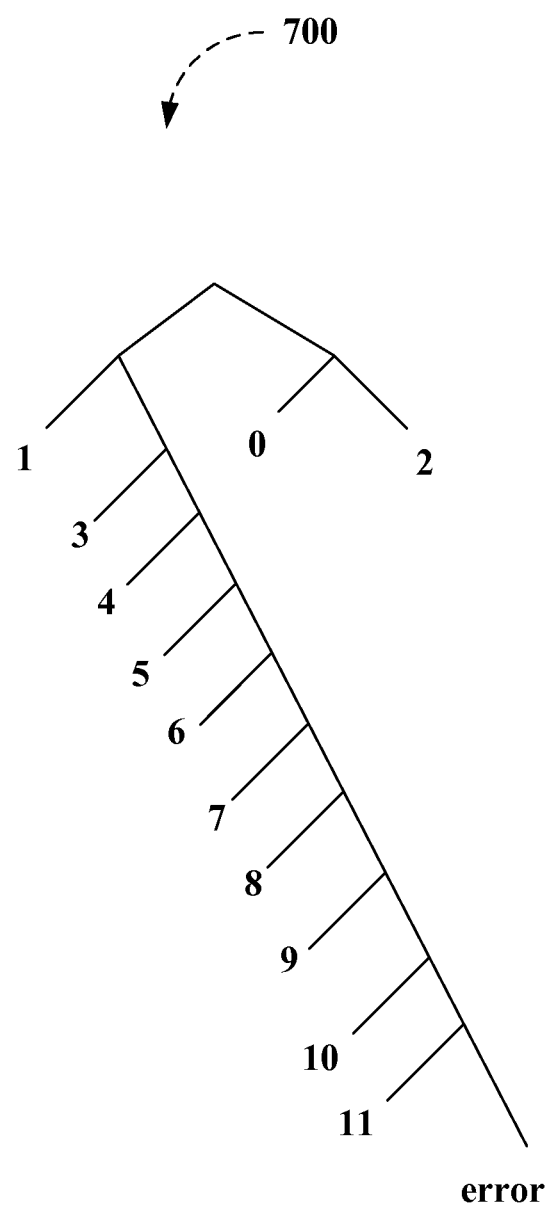
FIG. 7 illustrates the results achieved in an implementation in accordance with optimizations for video encoding processes in accordance with the innovation.
Figure 8:
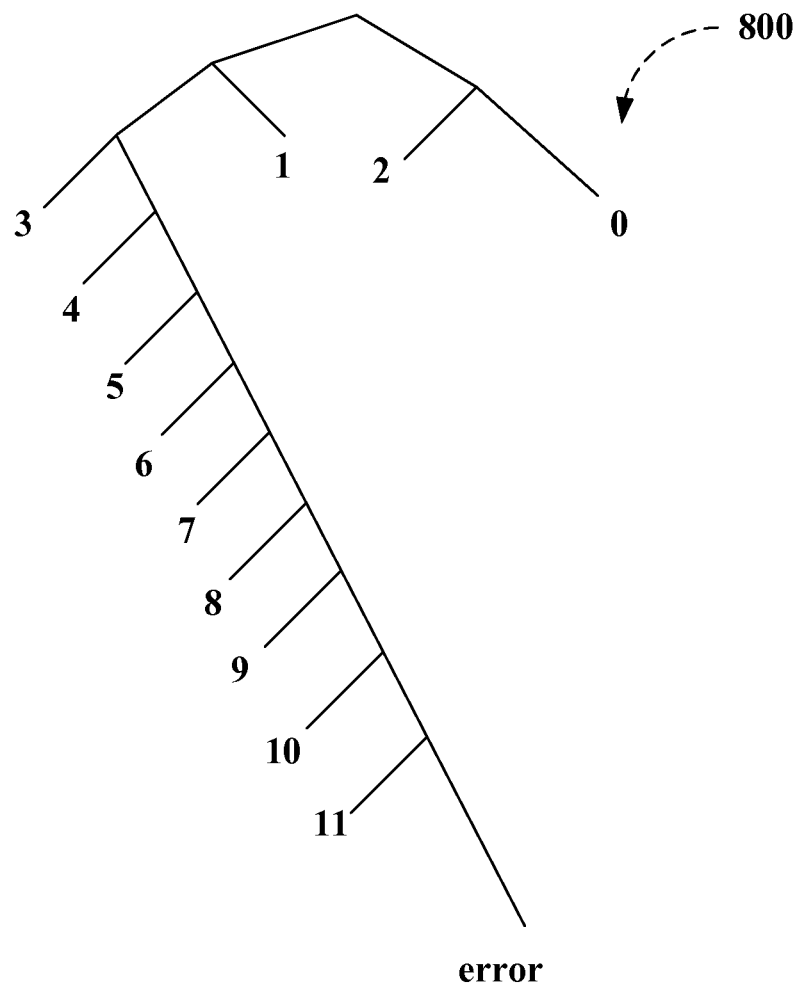
FIG. 8 is another flow diagram illustrating exemplary aspects of a process for performing optimized frame layer control rate for video encoding in accordance with the innovation.

FIG. 4A illustrates a methodology 400 including receiving data at 405, and encrypting the data using exactly four Huffman trees at 410. In other words four Huffman trees for JPEG DC coefficient coding are adopted in the simplified system. At 415, one of the Huffman trees is a right-hand 0-2-1 tree 500 as illustrated in FIG. 5. At 420, one of the Huffman trees is a right-hand 2-0-1 600 tree as illustrated in FIG. 6. At 425, one of the Huffman trees is a left-hand 1-0-2 tree 700 as illustrated in FIG. 7. And one of the Huffman trees is a left-hand 1-2-0 tree 800 as illustrated in FIG. 8. Wherein the left and right branches are labeled by 0 and 1 respectively. Notice that the symbols '0', '1' and '2' all correspond to the codeword subset {00, 01, 10, 11}. Since the expected coding length is two, one can roughly estimate their occurring probability as $2^{-2}$. Similar to Eq. 5, one can estimate a lower bound for the number of alias symbol strings, shown in Eq. 6.

Using a personal computer (PC) with a 3-GHz CPU, and assuming that in one second one can check $3 \times 10^9$ symbol strings, then an intruder has to calculate $10^8$ years even with the best computer in the world, which is around 10 times faster than the PC.

$$\frac{[(P_0 + P_1 + P_2)n]!}{(nP_0)! \times (nP_1)! \times (nP_2)!} \approx 1.5 \times 10^{32} \approx 2^{106} \qquad \text{Eq. (6)}$$

The security of the multimedia encryption schemes using multiple Huffman tables has been analyzed. The result of known-plaintext attack shows that the multiple Huffman tables should be carefully selected to avoid the weak keys problem. Chosen-plaintext attacks are then proposed to evaluate the basic MHT algorithm as well as the enhanced scheme with random bit insertion. Guided by two empirical criteria for Huffman table selection, one can further suggest a simplified scheme to achieve a relatively high level of security.

Figure 4B:
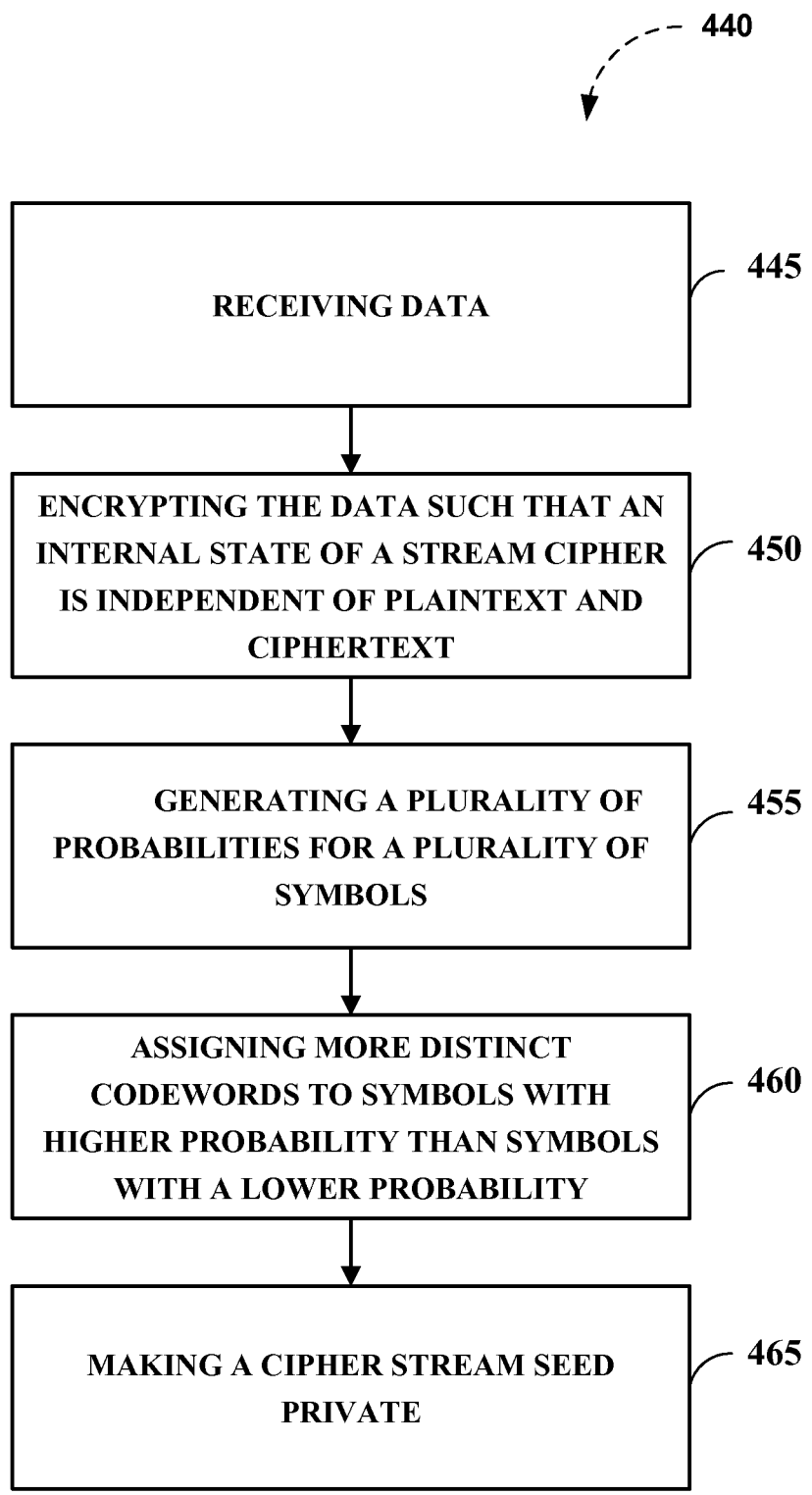

FIG. 4B illustrates a methodology 440 including receiving data at 445, and encrypting the data such that an internal state of a stream cipher is independent of plaintext and ciphertext at 450. At 455 is generating a plurality of probabilities for a plurality of symbols. At 460 is assigning more distinct codewords to symbols with higher probability than symbols with a lower probability. At 465 is making a cipher stream seed private.

Figure 4C:
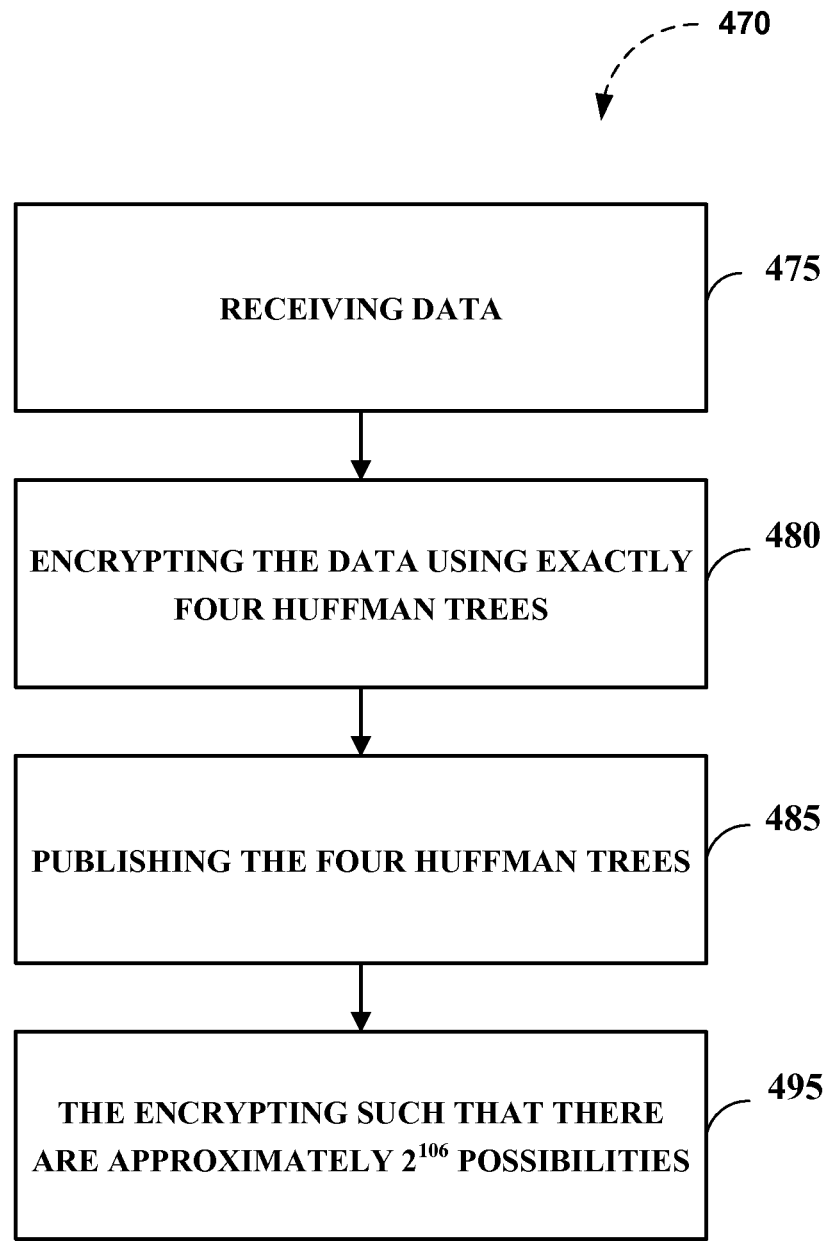

FIG. 4C illustrates a methodology 470 including receiving data at 475 and encrypting the data using exactly four Huffman trees at 480. At 485 is publishing the four Huffman trees. At 495 is encrypting such that there are approximately $2^{106}$ possibilities as set forth regarding equation 6. By approximately it is meant within 20 percent give or take.

FIGS. 5-8 illustrates a right-hand 0-2-1 Huffman tree 500, a right-hand 2-0-1 Huffman tree 600, a left-hand 1-0-2 Huffman 700 and a left-hand 1-2-0 Huffman tree 800, such that there are two right hand trees and two left hand trees. Handedness is determined by viewing the 3-11 branches as fingers and the direction of the zero branch as an opposable thumb.

Exemplary Computer Networks and Environments

One of ordinary skill in the art can appreciate that the innovation can be implemented in connection with any computer or other client or server device, which can be deployed as part of a computer network, or in a distributed computing environment, connected to any kind of data store. In this regard, the present innovation pertains to any computer system or environment having any number of memory or storage units, and any number of applications and processes occurring across any number of storage units or volumes, which may be used in connection with encoding processes as described herein. The present innovation may apply to an environment with server computers and client computers deployed in a network environment or a distributed computing environment, having remote or local storage. The present innovation may also be applied to standalone computing devices, having programming language functionality, interpretation and execution capabilities for generating, receiving and transmitting information in connection with remote or local services and processes.

Distributed computing provides sharing of computer resources and services by exchange between computing devices and systems. These resources and services include the exchange of information, cache storage and disk storage for objects, such as files. Distributed computing takes advantage of network connectivity, allowing clients to leverage their collective power to benefit the entire enterprise. In this regard, a variety of devices may have applications, objects or resources that may implicate the encoding processes of the innovation.

Figure 9:
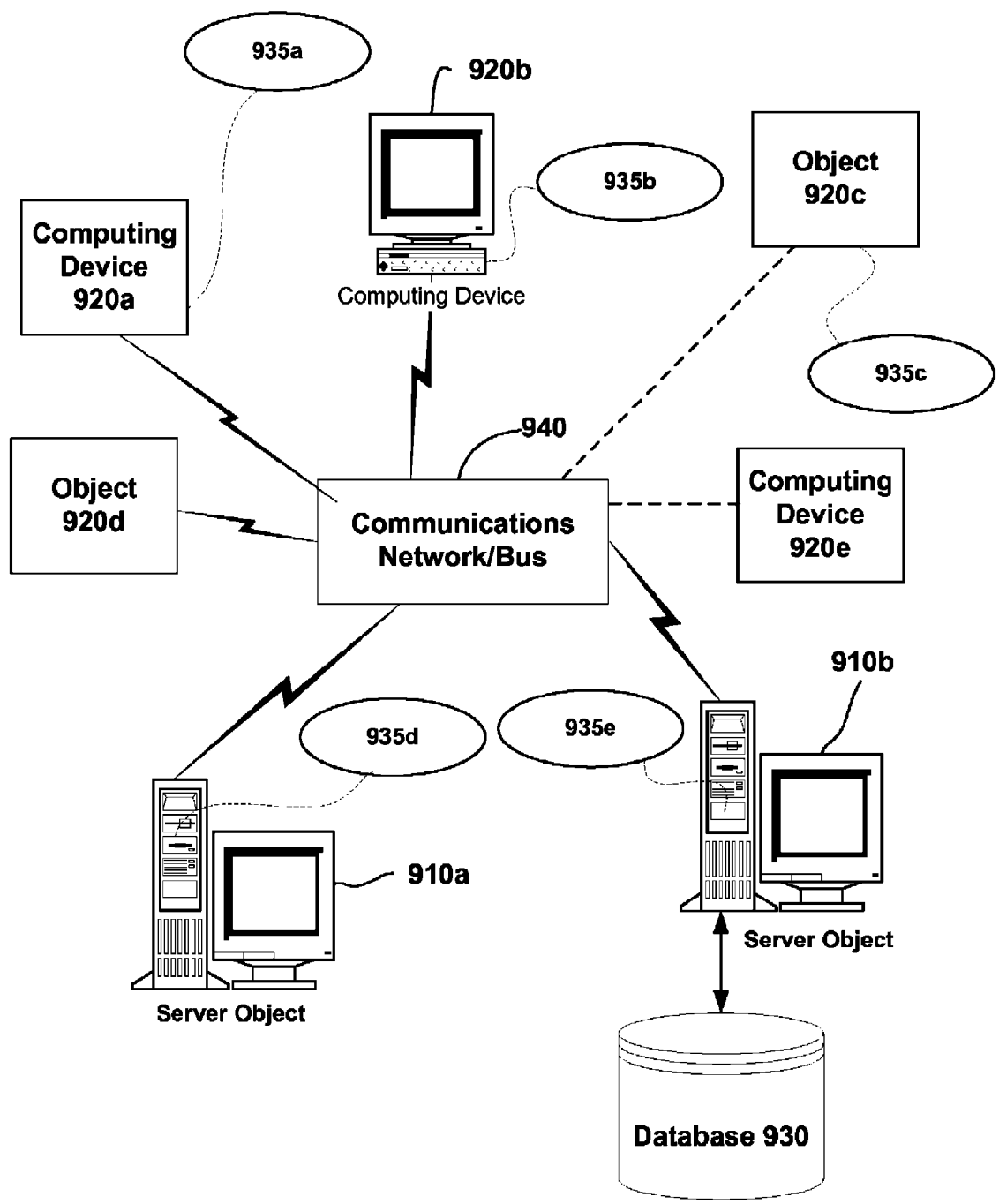
FIG. 9 is a block diagram representing an exemplary non-limiting computing system or operating environment in which the present innovation may be implemented.

FIG. 9 provides a schematic diagram of an exemplary networked or distributed computing environment. The distributed computing environment comprises computing objects 910a, 910b, etc. and computing objects or devices 920a, 920b, 920c, 920d, 920e, etc. These objects may comprise programs, methods, data stores, programmable logic, etc. The objects may comprise portions of the same or different devices such as PDAs, audio/video devices, MP3 players, personal computers, etc. Each object can communicate with another object by way of the communications network 940. This network may itself comprise other computing objects and computing devices that provide services to the system of FIG. 9, and may itself represent multiple interconnected networks. In accordance with an aspect, each object 910a, 910b, etc. or 920a, 920b, 920c, 920d, 920e, etc. may contain an application that might make use of an API, or other object, software, firmware and/or hardware, suitable for use with the design framework.

It can also be appreciated that an object, such as 920c, may be hosted on another computing device 910a, 910b, etc. or 920a, 920b, 920c, 920d, 920e, etc. Thus, although the physical environment depicted may show the connected devices as computers, such illustration is merely exemplary and the physical environment may alternatively be depicted or described comprising various digital devices such as PDAs, televisions, MP3 players, etc., any of which may employ a variety of wired and wireless services, software objects such as interfaces, COM objects, and the like.

There are a variety of systems, components, and network configurations that support distributed computing environments. For example, computing systems may be connected together by wired or wireless systems, by local networks or widely distributed networks. Currently, many of the networks are coupled to the Internet, which provides an infrastructure for widely distributed computing and encompasses many different networks. Any of the infrastructures may be used for exemplary communications made incident to encoding processes according to the present innovation.

In home networking environments, there are at least four disparate network transport media that may each support a unique protocol, such as Power line, data (both wireless and wired), voice (e.g., telephone) and entertainment media. Most home control devices such as light switches and appliances may use power lines for connectivity. Data Services may enter the home as broadband (e.g., either DSL or Cable modem) and are accessible within the home using either wireless (e.g., HomeRF or 802.11A/B/G) or wired (e.g., Home PNA, Cat 5, Ethernet, even power line) connectivity. Voice traffic may enter the home either as wired (e.g., Cat 3) or wireless (e.g., cell phones) and may be distributed within the home using Cat 3 wiring. Entertainment media, or other graphical data, may enter the home either through satellite or cable and is typically distributed in the home using coaxial cable. IEEE 1394 and DVI are also digital interconnects for clusters of media devices. All of these network environments and others that may emerge, or already have emerged, as protocol standards may be interconnected to form a network, such as an intranet, that may be connected to the outside world by way of a wide area network, such as the Internet. In short, a variety of disparate sources exist for the storage and transmission of data, and consequently, any of the computing devices of the present innovation may share and communicate data in any existing manner, and no one way described in the embodiments herein is intended to be limiting.

The Internet commonly refers to the collection of networks and gateways that utilize the Transmission Control Protocol/Internet Protocol (TCP/IP) suite of protocols, which are well-known in the art of computer networking. The Internet can be described as a system of geographically distributed remote computer networks interconnected by computers executing networking protocols that allow users to interact and share information over network(s). Because of such wide-spread information sharing, remote networks such as the Internet have thus far generally evolved into an open system with which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the illustration of FIG. 9, as an example, computers 920a, 920b, 920c, 920d, 920e, etc. can be thought of as clients and computers 910a, 910b, etc. can be thought of as servers where servers 910a, 910b, etc. maintain the data that is then replicated to client computers 920a, 920b, 920c, 920d, 920e, etc., although any computer can be considered a client, a server, or both, depending on the circumstances. Any of these computing devices may be processing data or requesting services or tasks that may implicate the encoding processes described herein.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the encoding processes of the innovation may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

Thus, FIG. 9 illustrates an exemplary networked or distributed environment, with server(s) in communication with client computer (s) via a network/bus, in which the present innovation may be employed. In more detail, a number of servers 910a, 910b, etc. are interconnected via a communications network/bus 940, which may be a LAN, WAN, intranet, GSM network, the Internet, etc., with a number of client or remote computing devices 920a, 920b, 920c, 920d, 920e, etc., such as a portable computer, handheld computer, thin client, networked appliance, or other device, such as a VCR, TV, oven, light, heater and the like in accordance with the present innovation. It is thus contemplated that the present innovation may apply to any computing device in connection with which it is desirable to communicate data over a network.

In a network environment in which the communications network/bus 940 is the Internet, for example, the servers 910a, 910b, etc. can be Web servers with which the clients 920a, 920b, 920c, 920d, 920e, etc. communicate via any of a number of known protocols such as HTTP. Servers 910a, 910b, etc. may also serve as clients 920a, 920b, 920c, 920d, 920e, etc., as may be characteristic of a distributed computing environment.

As mentioned, communications may be wired or wireless, or a combination, where appropriate. Client devices 920a, 920b, 920c, 920d, 920e, etc. may or may not communicate via communications network/bus 14, and may have independent communications associated therewith. For example, in the case of a TV or VCR, there may or may not be a networked aspect to the control thereof. Each client computer 920a, 920b, 920c, 920d, 920e, etc. and server computer 910a, 910b, etc. may be equipped with various application program modules or objects 935a, 935b, 935c, etc. and with connections or access to various types of storage elements or objects, across which files or data streams may be stored or to which portion(s) of files or data streams may be downloaded, transmitted or migrated. Any one or more of computers 910a, 910b, 920a, 920b, 920c, 920d, 920e, etc. may be responsible for the maintenance and updating of a database 930 or other storage element, such as a database or memory 930 for storing data processed or saved according to the innovation. Thus, the present innovation can be utilized in a computer network environment having client computers 920a, 920b, 920c, 920d, 920e, etc. that can access and interact with a computer network/bus 940 and server computers 910a, 910b, etc. that may interact with client computers 920a, 920b, 920c, 920d, 920e, etc. and other like devices, and databases 930.

Exemplary Computing Device

Figure 10:
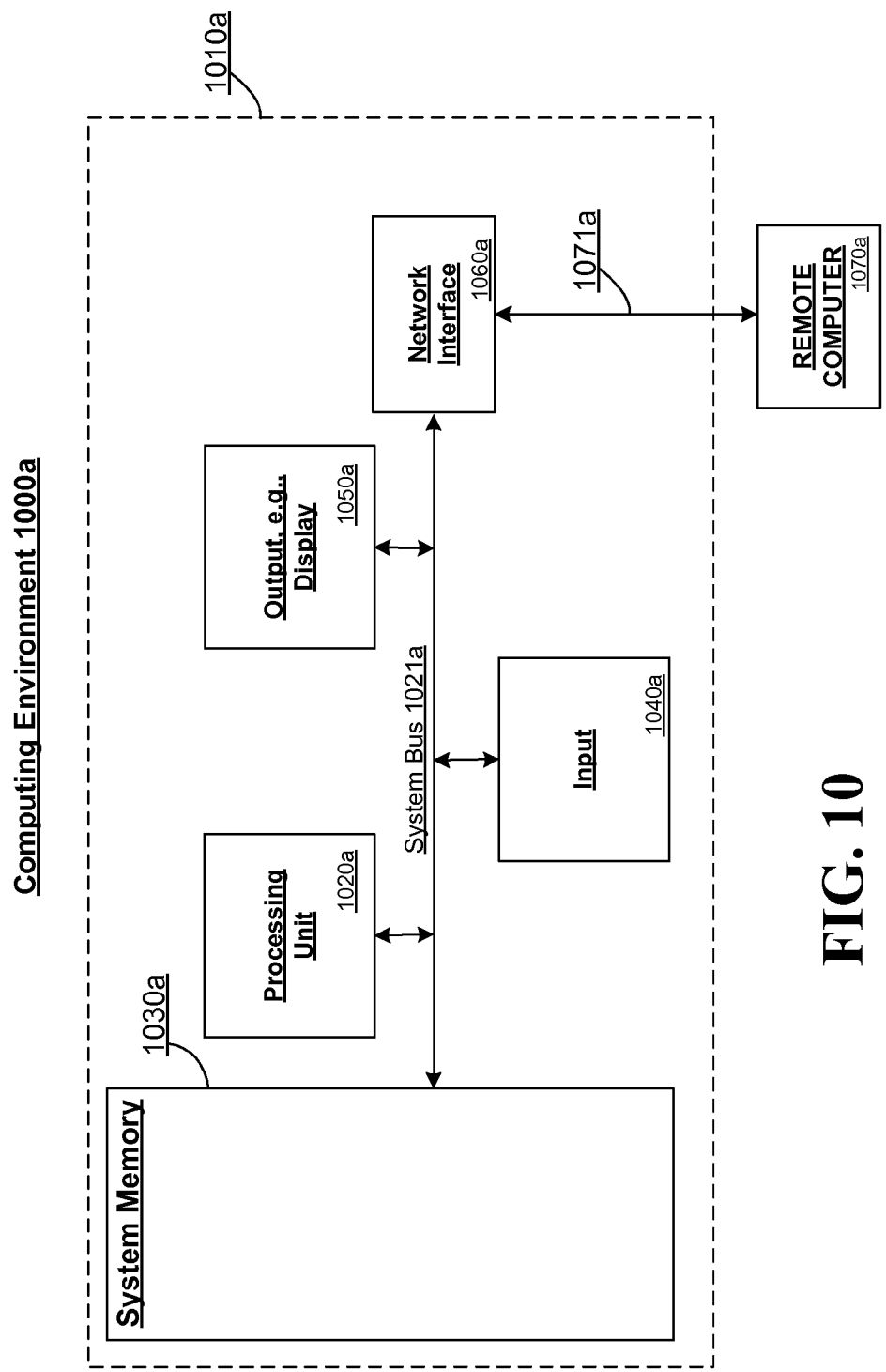
FIG. 10 illustrates an overview of a network environment suitable for service by embodiments of the innovation.

As mentioned, the innovation applies to any device wherein it may be desirable to communicate data, e.g., to a mobile device. It should be understood, therefore, that handheld, portable and other computing devices and computing objects of all kinds are contemplated for use in connection with the present innovation, i.e., anywhere that a device may communicate data or otherwise receive, process or store data. Accordingly, the below general purpose remote computer described below in FIG. 10 is but one example, and the present innovation may be implemented with any client having network/bus interoperability and interaction. Thus, the present innovation may be implemented in an environment of networked hosted services in which very little or minimal client resources are implicated, e.g., a networked environment in which the client device serves merely as an interface to the network/bus, such as an object placed in an appliance.

Although not required, the innovation can partly be implemented via an operating system, for use by a developer of services for a device or object, and/or included within application software that operates in connection with the component(s) of the innovation. Software may be described in the general context of computer executable instructions, such as program modules, being executed by one or more computers, such as client workstations, servers or other devices. Those skilled in the art will appreciate that the innovation may be practiced with other computer system configurations and protocols.

FIG. 10 thus illustrates an example of a suitable computing system environment 1000a in which the innovation may be implemented, although as made clear above, the computing system environment 1000a is only one example of a suitable computing environment for a media device and is not intended to suggest any limitation as to the scope of use or functionality of the innovation. Neither should the computing environment 1000a be interpreted as having any dependency or requirement relating to any one or combination of components illustrated in the exemplary operating environment 1000a.

With reference to FIG. 10, an exemplary remote device for implementing the innovation includes a general purpose computing device in the form of a computer 1010a. Components of computer 1010a may include, but are not limited to, a processing unit 1020a, a system memory 1030a, and a system bus 1021a that couples various system components including the system memory to the processing unit 1020a. The system bus 1021a may be any of several types of bus structures including a memory bus or memory controller, a peripheral bus, and a local bus using any of a variety of bus architectures.

Computer 1010a typically includes a variety of computer readable media. Computer readable media can be any available media that can be accessed by computer 1010a. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1010*a*. Communication media typically embodies computer readable instructions, data structures, program modules or other data in a modulated data signal such as a carrier wave or other transport mechanism and includes any information delivery media.

The system memory 1030*a* may include computer storage media in the form of volatile and/or nonvolatile memory such as read only memory (ROM) and/or random access memory (RAM). A basic input/output system (BIOS), containing the basic routines that help to transfer information between elements within computer 1010*a*, such as during start-up, may be stored in memory 1030*a*. Memory 1030*a* typically also contains data and/or program modules that are immediately accessible to and/or presently being operated on by processing unit 1020*a*. By way of example, and not limitation, memory 1030*a* may also include an operating system, application programs, other program modules, and program data.

The computer 1010*a* may also include other removable/non-removable, volatile/nonvolatile computer storage media. For example, computer 1010*a* could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive is typically connected to the system bus 1021*a* through a non-removable memory interface such as an interface, and a magnetic disk drive or optical disk drive is typically connected to the system bus 1021*a* by a removable memory interface, such as an interface.

A user may enter commands and information into the computer 1010*a* through input devices such as a keyboard and pointing device, commonly referred to as a mouse, trackball or touch pad. Other input devices may include a microphone, joystick, game pad, satellite dish, scanner, or the like. These and other input devices are often connected to the processing unit 1020*a* through user input 1040*a* and associated interface(s) that are coupled to the system bus 1021*a*, but may be connected by other interface and bus structures, such as a parallel port, game port or a universal serial bus (USB). A graphics subsystem may also be connected to the system bus 1021*a*. A monitor or other type of display device is also connected to the system bus 1021*a* via an interface, such as output interface 1050*a*, which may in turn communicate with video memory. In addition to a monitor, computers may also include other peripheral output devices such as speakers and a printer, which may be connected through output interface 1050*a*.

The computer 1010*a* may operate in a networked or distributed environment using logical connections to one or more other remote computers, such as remote computer 1070*a*, which may in turn have media capabilities different from device 1010*a*. The remote computer 1070*a* may be a personal computer, a server, a router, a network PC, a peer device or other common network node, or any other remote media consumption or transmission device, and may include any or all of the elements described above relative to the computer 1010*a*. The logical connections depicted in FIG. 10 include a network 1071*a*, such local area network (LAN) or a wide area network (WAN), but may also include other networks/buses. Such networking environments are commonplace in homes, offices, enterprise-wide computer networks, intranets and the Internet.

When used in a LAN networking environment, the computer 1010*a* is connected to the LAN 1071*a* through a network interface or adapter. When used in a WAN networking environment, the computer 1010*a* typically includes a communications component, such as a modem, or other means for establishing communications over the WAN, such as the Internet. A communications component, such as a modem, which may be internal or external, may be connected to the system bus 1021*a* via the user input interface of input 1040*a*, or other appropriate mechanism. In a networked environment, program modules depicted relative to the computer 1010*a*, or portions thereof, may be stored in a remote memory storage device. It will be appreciated that the network connections shown and described are exemplary and other means of establishing a communications link between the computers may be used.

While the present innovation has been described in connection with the preferred embodiments of the various Figures, it is to be understood that other similar embodiments may be used or modifications and additions may be made to the described embodiment for performing the same function of the present innovation without deviating therefrom. For example, one skilled in the art will recognize that the present innovation as described in the present application may apply to any environment, whether wired or wireless, and may be applied to any number of such devices connected via a communications network and interacting across the network. Therefore, the present innovation should not be limited to any single embodiment, but rather should be construed in breadth and scope in accordance with the appended claims.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Various implementations of the innovation described herein may have aspects that are wholly in hardware, partly in hardware and partly in software, as well as in software. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

Thus, the methods and apparatus of the present innovation, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the innovation. In the case of program code execution on programmable computers, the computing device generally includes a processor, a storage medium readable by the processor (including volatile and non-volatile memory and/or storage elements), at least one input device, and at least one output device.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The terms "article of manufacture", "computer program product" or similar terms, where used herein, are intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally, it is known that a carrier wave can be employed to carry computer-readable electronic data such as those used in transmitting and receiving electronic mail or in accessing a network such as the Internet or a local area network (LAN).

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components, e.g., according to a hierarchical arrangement. Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter will be better appreciated with reference to the various flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

While the present innovation has been described in connection with the preferred embodiments of the various figures, it is to be understood that other similar embodiments may be used or modifications and additions may be made to the described embodiment for performing the same function of the present innovation without deviating therefrom.

While exemplary embodiments refer to utilizing the present innovation in the context of particular programming language constructs, specifications or standards, the innovation is not so limited, but rather may be implemented in any language to perform the encoding processes. Still further, the present innovation may be implemented in or across a plurality of processing chips or devices, and storage may similarly be effected across a plurality of devices. Therefore, the present innovation should not be limited to any single embodiment, but rather should be construed in breadth and scope in accordance with the appended claims.

What is claimed is:

1. A method, comprising:
   determining, via at least one computing device, respective occurring probabilities of symbols comprising data to be encrypted;
   selecting, via the at least one computing device, at least four Huffman trees according to a criterion that assigns respective numbers of codewords to the symbols as a function of the respective occurring probabilities, wherein the at least four Huffman trees comprise at least two right-hand Huffman trees and at least two left-hand Huffman trees; and
   encrypting, via the at least one computing device, the data using the at least four Huffman trees and a stream cipher to obtain encrypted data, wherein an internal state of the stream cipher is independent of ciphertext associated with the encrypted data.

2. The method of claim 1, further including:
   publishing the at least four Huffman trees.

3. The method of claim 1, wherein the selecting the at least four Huffman trees includes selecting a right-hand 0-2-1 tree.

4. The method of claim 3, wherein the selecting the at least four Huffman trees includes selecting a right-hand 2-0-1 tree.

5. The method of claim 4, wherein the selecting the at least four Huffman trees includes selecting a left-hand 1-0-2 tree.

6. The method of claim 5, wherein the selecting the at least four Huffman trees includes selecting a left-hand 1-2-0 tree.

7. The method of claim 1, wherein the encrypting includes encrypting the data based on approximately $2^{106}$ possibilities associated with different encryption results for the encrypted data.

8. The method of claim 1, further comprising assigning the respective numbers of codewords to the symbols in direct proportion to the respective occurring probabilities.

9. The method of claim 1, further comprising:
   maintaining a cipher stream seed as private information.

10. The method of claim 1, wherein the encrypting includes encrypting the data using exactly four Huffman trees.

11. The method of claim 1, wherein the encrypting comprises encrypting the data based on a private seed for the stream cipher.

12. The method of claim 1, wherein the encrypting comprises encrypting the data using, as at least a subset of the at least four Huffman trees, one or more publicly accessible Huffman trees.

13. The method of claim 1, wherein the encrypting the data comprises encrypting plaintext.

14. A method, comprising:
receiving, by one or more computing devices, data to be encrypted, the data including symbols; and
selecting, by the one or more computing devices, at least two right-hand Huffman tables and at least two left-hand Huffman tables according to a criterion for assignment of respective quantities of codewords to the symbols as a function of respective occurring probabilities of the symbols; and
encrypting, by the one or more computing devices, the data using the at least two right-hand Huffman tables, the at least two left-hand Huffman tables, and a stream cipher to obtain a result, wherein an internal state of the stream cipher is independent of ciphertext associated with the result.

15. The method of claim 14, wherein the encrypting the data includes encrypting the data using a right-hand 0-2-1 tree and a right-hand 2-0-1 tree.

16. The method of claim 15, wherein the encrypting the data includes encrypting the data using a left-hand 1-0-2 tree and a left-hand 1-2-0 tree.

17. The method of claim 14, further including:
publishing the at least two right-hand Huffman tables and at least two left-hand Huffman tables.

18. The method of claim 14, wherein the encrypting the data to obtain the result includes encrypting the data from among a number of possibilities on an order of $2^{106}$ encryption result possibilities.

19. The method of claim 14, further comprising:
maintaining a private cipher stream seed.

20. The method of claim 14, further comprising assigning the respective quantities of codewords to the symbols in direct proportion to the respective occurring probabilities.

21. A non-transitory computer-readable storage medium including computer-executable instructions that, in response to execution, cause a computing device to perform operations comprising:
determining respective occurring probabilities for symbols within data to be encrypted;
selecting at least four Huffman tables according to a criterion resulting in assignment of respective quantities of codewords to the symbols as a function of the respective occurring probabilities, wherein the at least four Huffman tables comprise at least two right-hand Huffman tables and at least two left-hand Huffman tables; and
encrypting the data using the at least four Huffman trees and a stream cipher to obtain encrypted data, wherein an internal state of the stream cipher is independent of ciphertext associated with the encrypted data.

22. The non-transitory computer-readable storage medium of claim 21, wherein the data comprises plaintext.

23. The non-transitory computer-readable storage medium of claim 21, the operations further comprising assigning the respective quantities of codewords to the symbols in direct proportion to the respective occurring probabilities.

24. An apparatus, comprising:
a memory;
at least one processor, communicatively coupled to the memory, configured to facilitate execution of computer-executable components, comprising;
a processing component configured to receive data to be encrypted, the data comprising symbols; and
an encryption component configured to select at least two right-hand Huffman tables and at least two left-hand Huffman tables according to a criterion for assignment of respective quantities of codewords to the symbols as a function of respective probabilities of occurrence of the symbols within the data, and to encrypt the data using a stream cipher, the at least two right-hand Huffman tables, and at least two left-hand Huffman tables to obtain encrypted data, wherein an internal state of the stream cipher is independent of ciphertext associated with the encrypted data.

25. The apparatus of claim 24, wherein the stream cipher is associated with a private seed.

* * * * *

UNITED STATES PATENT AND TRADEMARK OFFICE
CERTIFICATE OF CORRECTION

PATENT NO.        : 8,457,304 B2                                              Page 1 of 1
APPLICATION NO.   : 12/035614
DATED             : June 4, 2013
INVENTOR(S)       : Au et al.

It is certified that error appears in the above-identified patent and that said Letters Patent is hereby corrected as shown below:

In the Specification

In Column 2, Line 20, delete "compressio," and insert -- compression, --, therefor.

In Column 3, Line 22, delete "innovation." and insert -- innovation; --, therefor.

In Column 4, Line 19, delete "graphics system 210" and insert -- graphics system 310 --, therefor.

In Column 6, Line 15, delete "an be reduced" and insert -- can be reduced --, therefor.

Signed and Sealed this
Eighteenth Day of March, 2014

Michelle K. Lee
*Deputy Director of the United States Patent and Trademark Office*